US008832060B2

(12) United States Patent
Sundaresan et al.

(10) Patent No.: US 8,832,060 B2
(45) Date of Patent: *Sep. 9, 2014

(54) SHOPPING CONTEXT ENGINE

(71) Applicant: Ebay Inc., San Jose, CA (US)

(72) Inventors: Neelakantan Sundaresan, Mountain View, CA (US); Alec Reitter, Palo Alto, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/970,110

(22) Filed: Aug. 19, 2013

(65) Prior Publication Data

US 2013/0332309 A1    Dec. 12, 2013

Related U.S. Application Data

(63) Continuation of application No. 13/467,225, filed on May 9, 2012, now Pat. No. 8,516,000, which is a continuation of application No. 12/966,577, filed on Dec. 13, 2010, now Pat. No. 8,180,800, which is a continuation of application No. 11/423,421, filed on Jun. 9, 2006, now Pat. No. 7,853,577.

(51) Int. Cl.
*G06F 17/30* (2006.01)

(52) U.S. Cl.
CPC .................................... *G06F 17/30* (2013.01)
USPC ........... 707/706; 707/713; 707/722; 707/736; 707/758; 707/781

(58) Field of Classification Search
CPC ....................................................... G06F 17/30
USPC .................................................. 707/600–899
See application file for complete search history.

(56) References Cited

U.S. PATENT DOCUMENTS

| 7,831,688 | B2 | 11/2010 | Linyard et al. |
| 7,853,577 | B2 | 12/2010 | Sundaresan et al. |
| 8,180,800 | B2 | 5/2012 | Sundaresan et al. |
| 8,516,000 | B2 | 8/2013 | Sundaresan et al. |
| 2003/0164844 | A1 | 9/2003 | Kravitz et al. |
| 2004/0260695 | A1 | 12/2004 | Brill |

(Continued)

OTHER PUBLICATIONS

"U.S. Appl. No. 11/423,421 Notice of Allowance mailed Aug. 6, 2010", 4 pgs.

(Continued)

*Primary Examiner* — Isaac M Woo
(74) *Attorney, Agent, or Firm* — Schwegman, Lundberg & Woessner, P.A.

(57) ABSTRACT

A system receives context data associated with a context and a user. The system then associates the context data to a user identifier and retrieves data associated with the context. The system then filters the data according to the context data to create result data. In another embodiment, the system also receives context data from a plurality of users, where the context data pertains to one or more attributes of a context. The system then using the context data ranks the one or more attributes of the context to create ranked data and generates a user interface based on the ranked data. In yet another embodiment, the system communicates context data associated with a context and a user to a server, and receives result data created by the server filtering data retrieved based on the context data. The system then generates a user interface based on the result data.

11 Claims, 10 Drawing Sheets

(56) References Cited

U.S. PATENT DOCUMENTS

| | | |
|---|---|---|
| 2005/0120006 A1 | 6/2005 | Nye |
| 2006/0184512 A1* | 8/2006 | Kohanim et al. ............ 707/3 |
| 2007/0124296 A1* | 5/2007 | Toebes ............................ 707/5 |
| 2007/0288468 A1 | 12/2007 | Sundaresan et al. |
| 2011/0145252 A1 | 6/2011 | Sundaresan et al. |
| 2012/0221439 A1 | 8/2012 | Sundaresan et al. |

OTHER PUBLICATIONS

"U.S. Appl. No. 11/423,421, Final Office Action mailed Feb. 2, 2009", 11 pgs.

"U.S. Appl. No. 11/423,421, Final Office Action mailed Mar. 3, 2010", 10 pgs.

"U.S. Appl. No. 11/423,421, Non-Final Office Action mailed Aug. 4, 2009", 10 pgs.

"U.S. Appl. No. 11/423,421, Non-Final Office Action mailed Jul. 30, 2008", 13 pgs.

"U.S. Appl. No. 11/423,421, Response filed Apr. 28, 2008 to Restriction Requirement mailed Mar. 27, 2008", 6 pgs.

"U.S. Appl. No. 11/423,421, Response filed Jun. 2, 2009 to Final Office Action mailed Feb. 2, 2009", 12 pgs.

"U.S. Appl. No. 11/423,421, Response filed Jul. 27, 2010 to Final Office Action mailed Mar. 3, 2010", 9 pgs.

"U.S. Appl. No. 11/423,421, Response filed Nov. 2, 2009 to Non Final Office Action mailed Aug. 4, 2009", 9 pgs.

"U.S. Appl. No. 11/423,421, Response filed Dec. 1, 2008 to Non-Final Office Action mailed Jul. 30, 2008", 8 pgs.

"U.S. Appl. No. 11/423,421, Restriction Requirement mailed Mar. 27, 2008", 7 pgs.

"U.S. Appl. No. 12/966,577, Non Final Office Action mailed Aug. 23, 2011", 8 pgs.

"U.S. Appl. No. 12/966,577, Notice of Allowance mailed Jan. 18, 2012", 5 pgs.

"U.S. Appl. No. 12/966,577, Response filed Dec. 22, 2011 to Non Final Office Action mailed Aug. 23, 2011", 8 pgs.

"U.S. Appl. No. 13/467,225, Non Final Office Action mailed Jan. 25, 2013", 6 pgs.

"U.S. Appl. No. 13/467,225, Notice of Allowance mailed May 3, 2013", 6 pgs.

"U.S. Appl. No. 13/467,225, Response filed Apr. 24, 2013 to Non Final Office Action mailed Jan. 25, 2013", 8 pgs.

\* cited by examiner

SHOPPING CONTEXT ENGINE

RELATED APPLICATIONS

This application is a continuation of U.S. application Ser. No. 13/467,225, filed on May 9, 2012, which is a continuation of U.S. application Ser. No. 12/966,577, filed Dec. 13, 2010, which is a continuation of U.S. application Ser. No. 11/423,421, filed on Jun. 9, 2006, which applications are incorporated herein by reference in their entirety.

TECHNICAL FIELD

This application relates to a method and system to use an electronic commerce system, according to one embodiment, and more specifically, to user a shopping context engine.

BACKGROUND

Buying consumer products and services in a market place full of choices can often be a tedious task. Often times a consumer may begin the process of shopping by soliciting recommendations from friends and family or other sources such as magazines and Internet web sites. Sometimes recommendations are for a final product while at other times they are merely starting points for a consumer to investigate further.

For example, a consumer may want to buy a digital camera and a friend suggests buying nothing less than a five megapixel camera but makes no suggestion as to which model or brand. At which point the consumer may then make a note regarding the five megapixel camera and begins the process of refining the search with a constraint of nothing less than five megapixels. This time a friend recommends Kodak as a brand but not a model and the consumer makes another notation. Additionally, other notations may be made while investigating other informative avenues, such as specific web sites which deal in the desired product (or service).

This notational shopping process may continue for multiple brands and models until enough data is collected that the consumer is comfortable making purchasing decision. Because this process is very tedious and time consuming, some consumers may quit shopping for the product or settle for a product that does not fulfill their needs or criteria.

BRIEF DESCRIPTION OF THE DRAWINGS

The present invention is illustrated by way of example, and not by way of limitation, in the figures of the accompanying drawings in which.

DETAILED DESCRIPTION

In the following description, for purposes of explanation, numerous specific details are set forth in order to provide a thorough understanding of an embodiment of the present invention. It will be evident, however, to one skilled in the art that the present invention may be practiced without these specific details.

In one embodiment, a system receives context data associated with a context and a user. A context may be identified by one or more context identifiers. For example, a context identifier may include words and/or phrases from the general to the specific for either a product or service, such as "camera," "digital camera," 5 megapixel Canon digital camera," "plumber," and "new construction plumber."

The system may associate the context data of the context identified by the context identifier to a user identifier and then retrieve data associated with the context and filters the data according to the context data to create result data. In another embodiment, the system also receives context data from a plurality of users, where the context data pertains to one or more attributes, notes, reviews, and other data that may be associated with a context. For example, a context may be a digital camera and context data may be an attribute of brand name (e.g., Canon) and/or one or more notes or reviews regarding a digital camera or notes or reviews pertaining to the more specific, Canon digital camera. As discussed further below, the context data of notes and reviews may also include links, such as uniform resource locators (URLs), tags, or other metadata.

The system then uses the context data to rank the one or more attributes of the context and generates a user interface based on the ranked data. In yet another embodiment, the system communicates context data associated with a context and a user to a server and receives result data created by the server filtering data retrieved based on the context data. The system then generates a user interface based on the result data.

Figure 1:
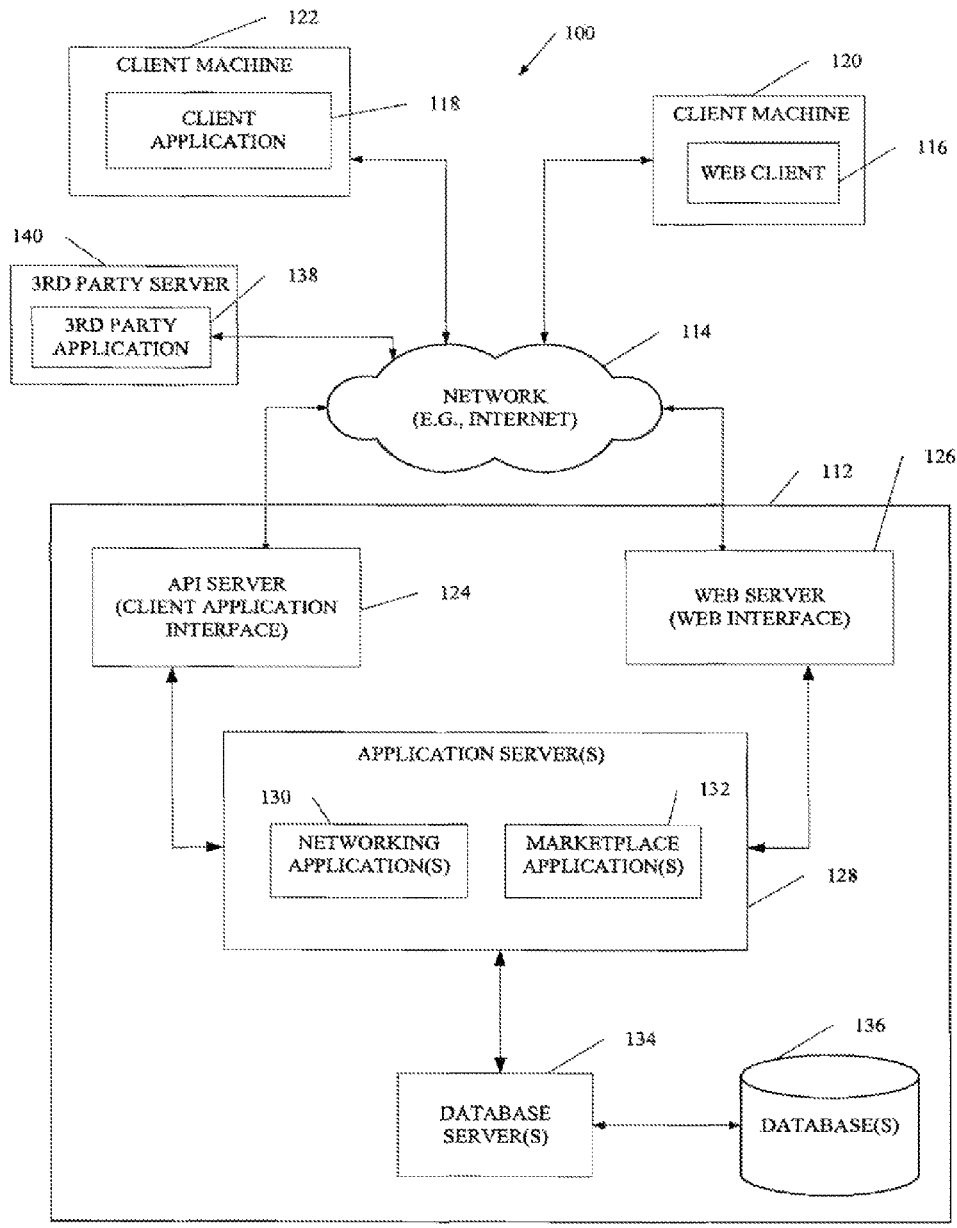
FIG. 1 is a network diagram depicting a network system, according to one embodiment, having a client-server architecture configured for exchanging data over a network.

FIG. 1 is a network diagram depicting a network system 100, according to one embodiment, having a client-server architecture configured for exchanging data over a network. For example, the network system 100 may be a trading/commerce system where clients may communicate and exchange data with the trading/commerce system, the data may pertain to various functions (e.g., online purchases) and aspects (e.g., managing social networks) associated with the network system 100. Although illustrated herein as a client-server architecture for simplicity, in other embodiments the network architecture may vary and include an architecture such as a peer machine in a peer-to-peer (or distributed) network environment.

Returning to FIG. 1, a data exchange platform, in an example form of a network-based provider 112, provides server-side functionality, via a network 114 (e.g., the Internet) to one or more clients. The one or more clients may include users that may utilize the network system 100 and more specifically, the network-based provider 112, to exchange data over the network 114. These transactions may include transmitting, receiving (communicating) and processing data to and from the multitude of users. The data may include, but is not limited to, context identifiers, context data, notations (e.g., personal and public shopping notes), context filter data, shared electronic shopping carts, product and service reviews, product, service, manufacture, and vendor recommendations and identifiers, product and service listings associated with buyers and sellers, auction bids, feedback, etc. In one embodiment, the product and service reviews, and the product, service, manufacture, and vendor recommendations are associated with one or more contexts generated by a user or other users and maintained on the network-based provider 112. Data associated with a context, such as any of the data described above, may be publicly shared as determined by the originator of the data.

Turning specifically to the network-based marketplace 112, an application program interface (API) server 124 and a web server 126 are coupled to, and provide programmatic and web interfaces respectively to, one or more application servers 128. The application servers 128 host one or more networking application(s) 130 and marketplace application(s) 132. The application servers 128 are, in turn, shown to be coupled to one or more databases servers 134 that facilitate access to one or more databases 136.

In one embodiment, the web server 126 may send and receive data pertaining to a context via a toolbar installed on a browser application. The toolbar may allow for a user to, inter alia, create a new context, selectively add a uniform resource locator (URL) associated with the created context, and create notations regarding research and general matters associated with the context. In other embodiments, the web server may serve a page or the API server 124 in conjunction with the client application 118 may provide the same or similar functionality as that described with reference to the toolbar. It may be noted that using a toolbar within an application such as a browser or stand alone application is well known in the art.

The marketplace application(s) 132 may provide a number of marketplace functions and services (e.g., listing, payment, etc.) to users that access the network-based marketplace 112. The networking application(s) 130 likewise may provide a number of social networking services and functions to users. The networking application(s) 130 may allow a user to generate one or more contexts related to shopping, which may include contexts (e.g., products and services) couched as a broad category associated with an item or to the more specific, the item itself. For example, a context in the form of a category could be "digital cameras," and the context in the form of a specific item may be a "Canon digital camera." The level of specificity may vary and is selectable by the context creator. For example, the context could be as specific as a make, model, and may include additional specific attributes or features.

In one embodiment, the networking application(s) 130 and marketplace application(s) 132 may provide a client (e.g., web client 116) with an interface that includes input fields for attributes most commonly selected by other users as the most important attributes. For example, the multitude of other users may have indicated they thought the most important attributes for the context of a digital camera are brand, pixel count, zoom, and size. These context attributes may be discovered by the network-based marketplace 112 by processing the attribute data received from the multitude of users or may be based on the context creator ranking the attributes or a combination thereof.

The networking application(s) 130 may allow the context creator to distribute the one or more contexts to one or more groups defined by the context creator (e.g., "my family," "my friends," etc.) or to groups at various levels in a predefined category (e.g., "photography group," "digital camera group," or "Canon digital camera group," etc.).

While the networking application(s) 130 and the marketplace application(s) 132 are shown in FIG. 1 to form part of the network-based marketplace 112, it will be appreciated that, in alternative embodiments, the networking application(s) 130 may form part of a social networking service that is separate and distinct from the network-based marketplace 112.

FIG. 1 also illustrates a third party application 138, executing on a third party server machine 140, as having programmatic access to the network-based marketplace 112 via the programmatic interface provided by the API server 124. For example, the third party application 138 may, utilizing information retrieved from the network-based marketplace 112, support one or more features or functions on a website hosted by the third party. The third party website may, for example, provide one or more networking, marketplace or payment functions that are supported by the relevant applications of the network-based marketplace 112.

Figure 2:
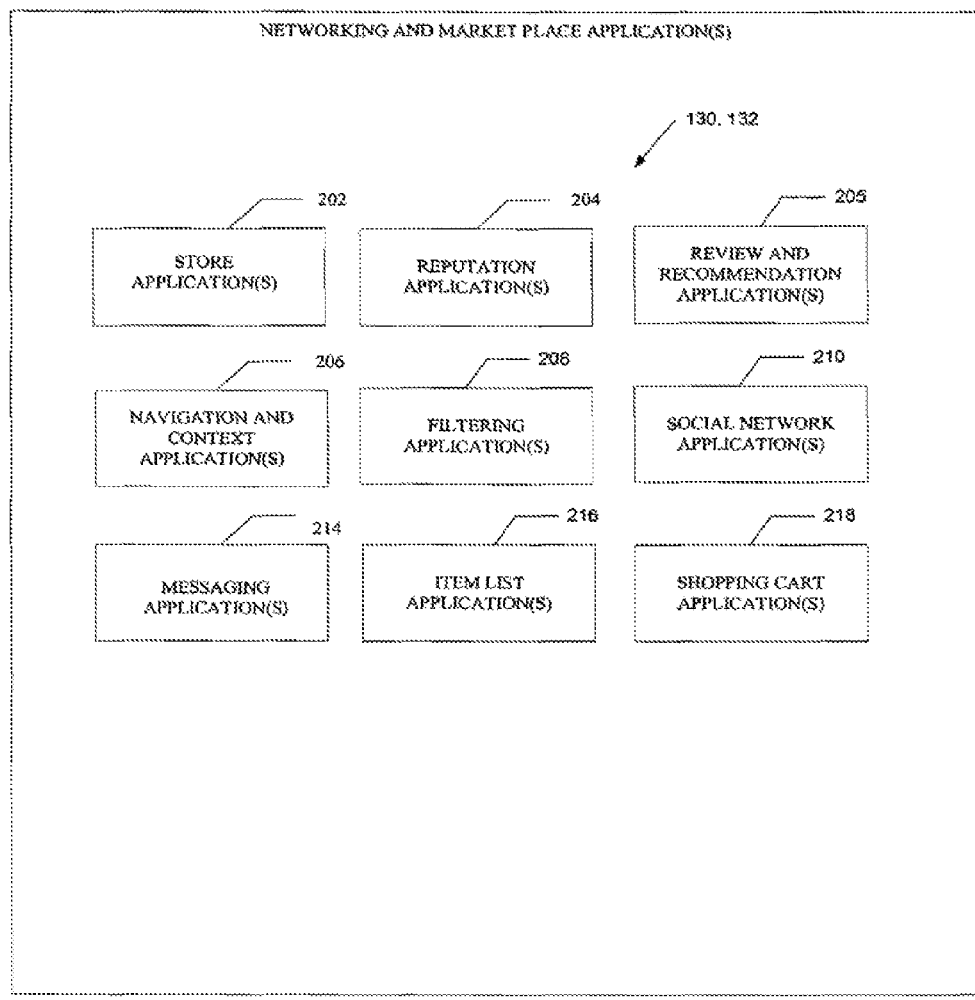
FIG. 2 is a block diagram illustrating an example embodiment of multiple network and marketplace applications, respectively, which are provided as part of a network-based marketplace.

FIG. 2 is a block diagram illustrating an example embodiment of multiple network and marketplace application(s) 130 and 132, respectively, which are provided as part of the network-based marketplace 112. The network-based marketplace 112 may provide a number context based shopping, social networking, and listing and price-setting mechanisms whereby a seller may list goods and/or services (e.g., for sale) and a buyer may buy listed goods and/or services. Another user or group member associated with a community group interested or associated with the context provided and shared by the context creator may offer or provide information that may be helpful in assisting the context creator in their shopping experience pertaining to the context. For example, another user or group member may provide a review of or recommendation list on a specific item corresponding to the context of "digital camera" (e.g., recommends Canon Elph, 6.1 megapixel). Among various embodiments, the recommendations, reviews, or research notes corresponding to the context may be directed from another user to one or more users desiring data associated with the context or the data may be provided from storage by the network and marketplace application(s) 130 and 132 based on the context provided by the context creator. The data may be provided based on a request from the context creator or automatically pushed to the context creator based on policy or a user configuration file.

To this end, the network and marketplace application(s) 130 and 132, respectively, are shown to include one or more application(s) which support the network-based marketplace 112, and more specifically the generation and maintenance of one or more contexts provided by users of the network-based marketplace 112. These applications include support for activities associated with the context, including storing and retrieving user notes, web sites (URLs), links associated with related tags, research and notes from other users and community member, related community groups, vendors, providing localized geographic data for contexts (e.g., a local plumber), etc. Additionally, the various applications may support social networking functions, including building and maintaining the community groups created by a user, which may be helpful in providing various types of data (e.g., reviews, notes, local services, etc.) pertaining to the context.

Store application(s) 202 may allow sellers to group their listings (e.g., goods and/or services) within a "virtual" store, which may be branded and otherwise personalized by and for the sellers. Such a virtual store may also offer promotions, incentives and features that are specific and personalized to a relevant seller. In one embodiment, based on the context provided by the context creator, the virtual store may be provided to the context creator where the virtual store may carry or sell the item or service associated with the context.

Reputation application(s) 204 may allow parties that transact utilizing the network-based marketplace 112 to establish, build, and maintain reputations, which may be made available and published to potential trading partners. Consider that where, for example, the network-based marketplace 112 supports person-to-person trading, users may have no history or other reference information whereby the trustworthiness and/or credibility of potential trading partners may be assessed. The reputation application(s) 204 may allow a user, for example through feedback provided by other transaction partners, to establish a reputation within the network-based marketplace 112 over time. Other potential trading partners may then reference such a reputation for the purposes of assessing credibility, trustworthiness, or the like. A user creating a context (context creator) and seeking reviews, research (e.g, notes, etc.), and recommendations associated with the context may filter the result data from the search or context submission based on reputation data. For example, the context creator may only want context data such as reviews and research notes pertaining to the context from other users with a greater than 3 out of 5 star reputation rating.

In one embodiment, the network-based marketplace 112 includes review and recommendation application(s) 205. The social networking application(s) 210 may work in conjunction with the review and recommendation application(s) 205 to provide a user interface to facilitate the entry of reviews of the context data received from other users. A review may be a text entry of the community group member's opinion, a standard review form including check boxes indicating a level satisfaction, or a combination of both, etc. Recommendations may include a specific type of item, a specific brand or service for a type of item, a specific retailer for the item, etc.

Navigation of the network-based marketplace 112 may be facilitated by one or more navigation and context application(s) 206. For example, a context application may, inter alia, enable key word searches of context data associated with a context, such as a product or service. The context data may be retrieved from the network-based marketplace 112 (e.g., databases 136) or from various other remote sources, such as other network sites, other users (e.g., experts or peers), etc. In one embodiment, a toolbar installed on a browser application may be used for functions including interactive and navigation functions to create a new context, selectively add a uniform resource locator (URL) associated with the created context, and create notations regarding research and general matters associated with the context. These functions may be user accessible by many methods known in the art, including a web form interface (HTML or embedded Java) or a stand alone application interface. For example, a navigation application may include a browser that allows users via an associated user interface to browse various contexts, catalogues, inventories, social networks, and review data structures within the network-based marketplace 112. In one embodiment, the user interface includes selectable elements in the form of tabs to separate out various categories of context data that when selected generate a list associated with the category. For example, a tab for "My Notes," a tab for "Everyone's Notes," a tab for "Buy," and a tab for "Sell" (e.g., see FIG. 8). Various other navigation applications (e.g., an external search engine) may be provided to supplement the search and browsing applications.

In one embodiment, using filtering application(s) 208, the context creator may customize result data associated with a context. The filtering application(s) 208 may generate the result data according to one or more rules provided by the network-based marketplace 112 and the context creator receiving the result data. For example, as discussed above with reference to the reputation application(s) 204, the context creator may only want context data such as reviews and research notes pertaining to the context from other users with a greater than 3 out of 5 star reputation rating. In another example, the context creator may only want context data such as reviews and research notes pertaining to a particular attribute of the context. For example, the context creator may only want result data for digital cameras with equal or greater than 5 megapixels. Additionally, the filtering rules may be combinable or modifiable to broaden or narrow the scope of the result data.

The filtering application(s) 208 may also be used to implement rules for granting or allowing access to the context creator's context data, such as the context creator's context(s) and associated research (e.g., notes, URLs, etc.). For example, another user's identifier may be "User123" and the result data based on context data received from User123 by the context creator may include four entries pertaining to the context, two notes and two URLs. The context creator may then create a rule to filter out all or a portion (e.g., just the notations) of the context data pertaining to User123.

Messaging application(s) 214 may be used for the generation and delivery of messages to users of the network-based marketplace 112. For example, the context creator may like a particular review or research from another user and may wish to contact the user for additional information. In one embodiment, the messaging application(s) 214 may be used in conjunction with the social networking application(s) 210 to provide promotional and/or marketing (e.g., targeted advertisements associated with the context) to the context creator from vendors and community members that may have offerings related to the context.

Item list application(s) 216 may be used in the network-based marketplace 112 by the context creator to create an item list based on selecting one or more items and services to purchase, which may be at least partially based on result data associated with the context creator's shopping experience. The item list application(s) 216 may be accessed via a user interface that allows the user to create and use the item list. Additionally, the context creator may selectively share this list within a community or to all users to gain or solicit additional data such as vendor recommendations for each purchase or vendor reviews for vendors that may be present in the list.

In one embodiment, electronic shopping cart application(s) 218 are used to create a shared electronic shopping cart used by a context creator to add and store items from a shopping list generated by the context creator (e.g., by making selections from a "Buy" tab). The electronic shopping cart application(s) 218 may facilitate the transactions for each item on the list by automatically finding the items in the electronic shopping cart across at least one or all of a set of vendors, a comparison shopping site, an auction site, other user's ads, etc. In one embodiment, a multitude of transactions may appear as one transaction based on the selection of "Bulk Purchase." In various embodiments, the selection criteria for which vendor or vendors to purchase from may include, but is not limited to, criteria such as lowest cost, fastest shipping time, preferred or highest rated vendors or sellers, or any combination thereof.

It will be appreciated that one or more the various example networking and marketplace application(s) 130, 132 may be combined into a single application including one or more modules. Further, in some embodiments of the inventions one or more applications may be omitted and additional applications may also be included.

Figure 3:
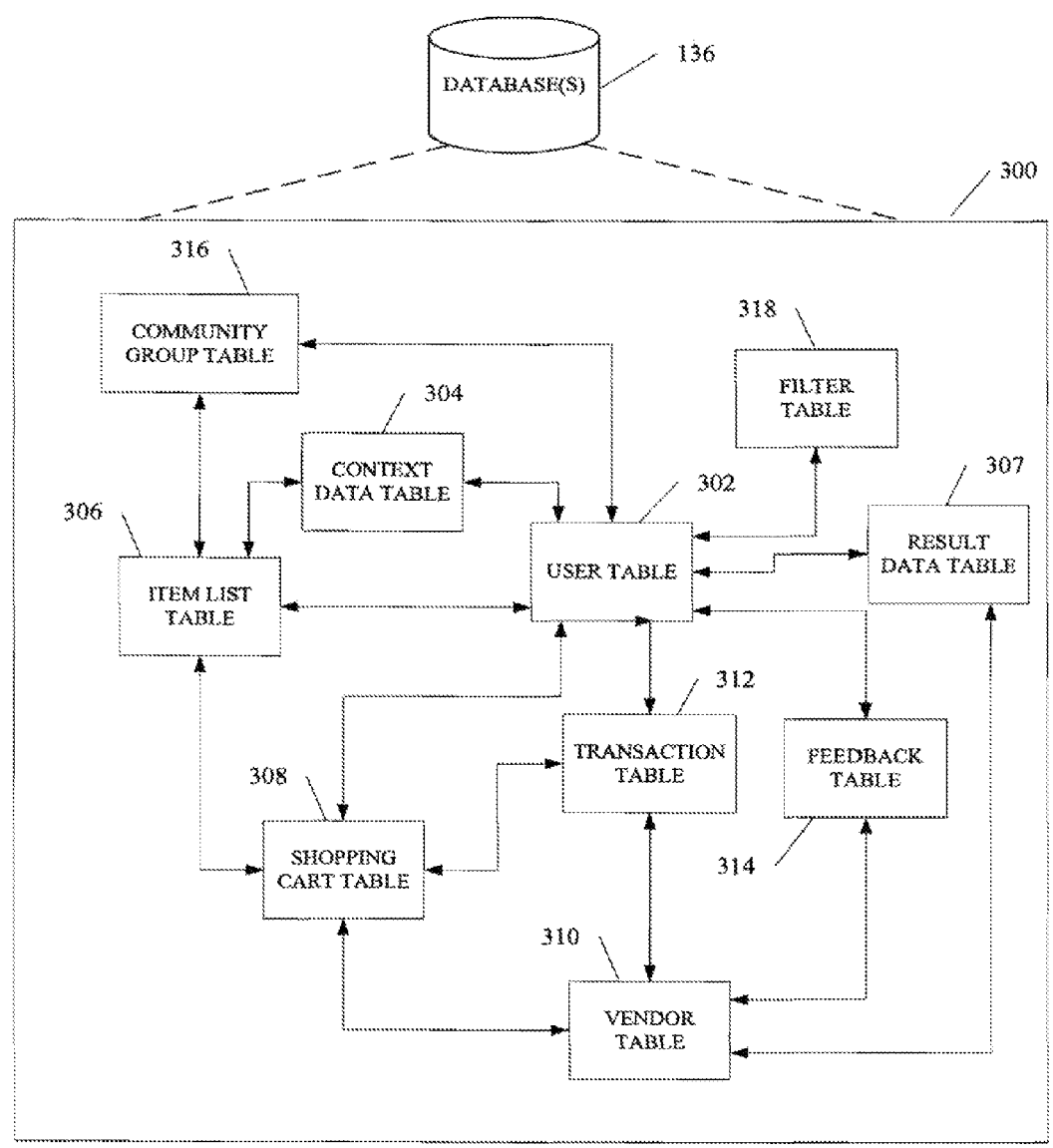
FIG. 3 is a high-level entity-relationship diagram, according to an example embodiment, illustrating various tables that may be maintained within a database to support networking and marketplace applications.

FIG. 3 is a high-level entity-relationship diagram, in accordance with an example embodiment, illustrating various tables 300 that may be maintained within the database(s) 136 (see FIG. 1), which may be utilized by and support the networking and marketplace application(s) 130 and 132, respectively. A user table 302 may contain a record for each registered user of the network-based marketplace 112, and may include identifier, address and financial instrument information pertaining to each such registered user. In one embodiment, a user operates as one or all of a context creator, a seller, a buyer, within the network-based marketplace 112.

The context data table 304 maintains a record of the one or more contexts created by a context creator (user). As discussed above, this may include context identifiers that may include words and/or phrases from the general to the specific for either a product or service. For example, "camera," "digital camera," 5 megapixel Canon digital camera," "plumber," "new construction plumber," etc. In one embodiment, each word in a phrase may be a tag linked to another context and its associated data. For example "Canon" may be a selectable element within the user interface as a tag that results in the selector receiving more general data regarding Canon products. Similarly, "camera" may be selected to receive more general data regarding cameras, in this case both digital and film cameras.

The tables 300 may also include an item list table 306 which maintains listing or item records for goods and/or services that were created by the context creator using the item list application(s) 216. In various embodiments, the item list may be created and shared with a community group or to all users in part to solicit feedback regarding listed or potential vendors.

Each listing or item record within the item list table 306 may furthermore be linked to one or more electronic shopping cart records within a electronic shopping cart table 308 and to one or more user records within the user table 302 and/or a vendor table 310, so as to associate a seller or vendor and one or more actual or potential buyers from the community group with each item record.

A transaction table 312 may contain a record for each transaction pertaining to items or listings for which records exist within the item list table 306. For example, the transaction table 312 may contain a purchase or sales transaction of an item of the item list by a context creator.

In one example embodiment, a feedback table 314 may be utilized by one or more of the reputation application(s) 204 to construct and maintain reputation information associated with users (e.g., members of the community group, sellers, etc.).

Group(s) of users found in a community group table 316 may be selected by a context creator to be members of a community group having access to context data and the listing associated with the electronic shopping cart.

A filter table 318 may be used to sort and filter data associated with the creation of a context. The sorted or filtered data are then stored in the result data table 307 and linked to the context creator via a context identifier associated with the context data table 304. Various types of filters and associated rules were discussed above with reference to the filtering application(s) 208 in FIG. 2.

Figure 4:
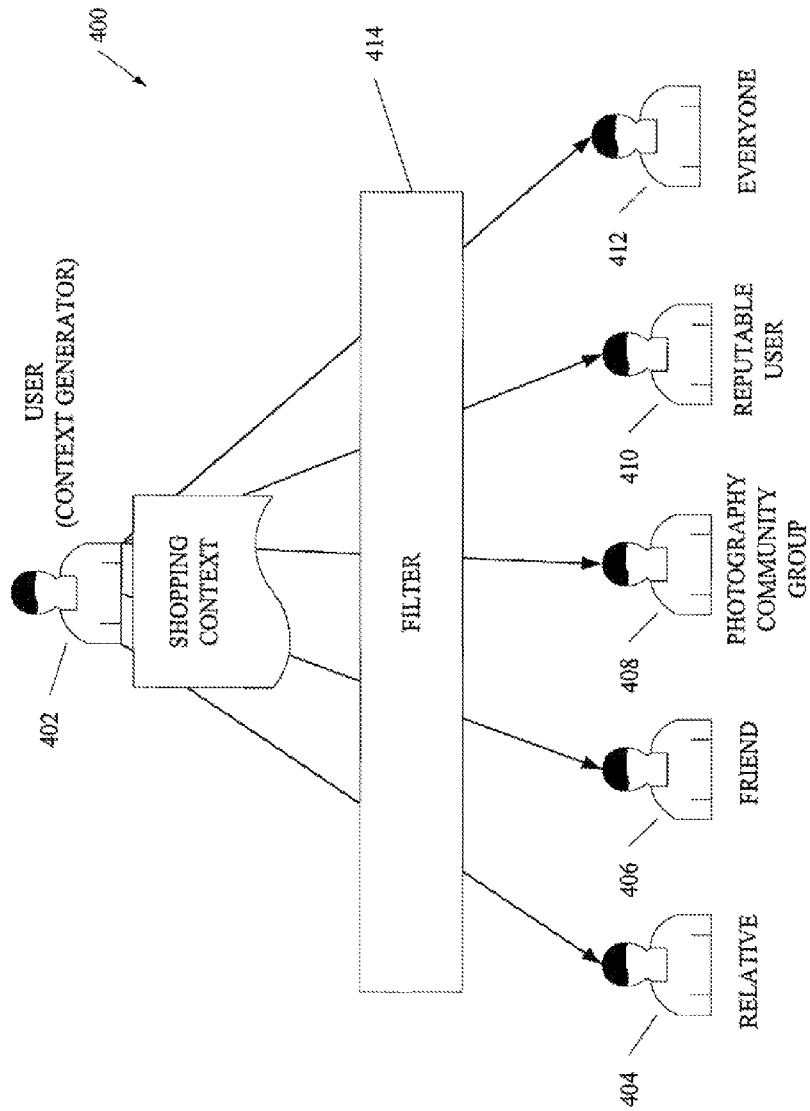
FIG. 4 illustrates a relationship diagram of a user group, according to an example embodiment.

FIG. 4 illustrates a relationship diagram of a user group 400, according to an example embodiment. The user group 400 includes various example types of associations or relatedness to the user 402 (e.g., the context generator). For example, the user group 400 may include a relative 404, a friend 406, a photography community group 408, a reputable user 410, and everyone 412. Which group, if any, has visibility to user 402's context or from which group the user 402 accepts data pertaining to the context may depend upon filter 414 corresponding to the filtering application(s) 208 and the rules in filter table 318. For example, the user 402 may create a rule that generates digital camera result data from data associated with the photography community group.

Figure 5A:
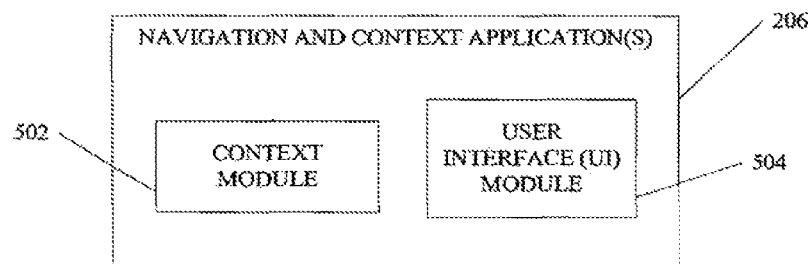
FIGS. 5A, 5B and 5C illustrate example embodiments of functional modules pertaining to some of the applications of FIG. 2.
Figure 5B:
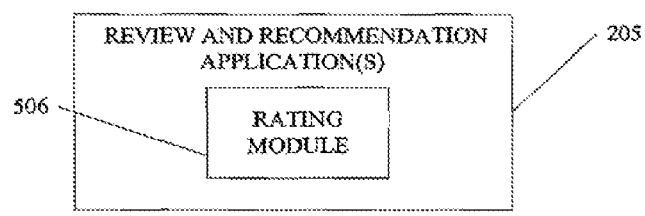
Figure 5C:
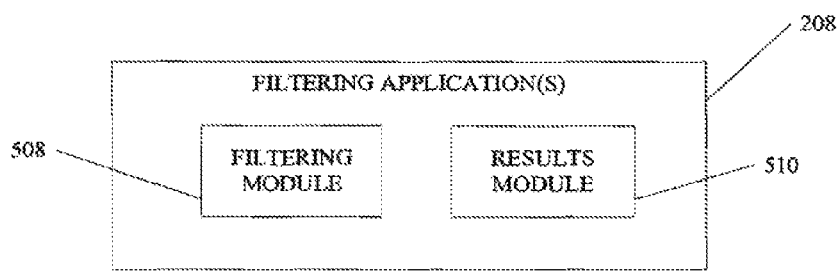

FIGS. 5A, 5B and 5C illustrate example embodiments of functional modules pertaining to some of the applications of FIG. 2. It will be appreciated that the applications and associated modules may be executed within any portion of the network system 100, (e.g., the client machine 122 and the network-based marketplace 112). Additionally, the modules discussed herein are for example only and it can be appreciated these modules and applications may be combined into one or many modules and applications without departing from the spirit of the methods and systems described herein.

FIG. 5A is a block diagram illustrating an example embodiment of a user interface module 502 which may be utilized by the navigation and context application(s) 206. In one embodiment, the user interface module 502 may provide a context creator with a user interface (e.g., toolbar on a browser application) for creating a context to be communicated back to the network-based marketplace 112. The context module 504 processes the context received as discussed above with reference to FIGS. 1, 2, and 3.

The user interface module may also work in conjunction with the ratings module 506 of the review and recommendation application(s) 205 (see FIG. 5B) to provide an interface for the context creator to rank result data received in response to creating the context. In one embodiment, the ranking of the result data is performed locally, while in another embodiment the ranking is communicated and stored at the network-based marketplace 112 for subsequent retrieval.

FIG. 5C illustrates the filtering application(s) 208, which includes a filter module 508 and a results module 510. In one embodiment, the filter module 508 may be used along with a results module 510 to filter and create rules associated with the result data and other users which may be associated with the created context. Examples of result data filtering based on rules are discussed above with reference to FIGS. 1, 2, and 3.

Figure 6:
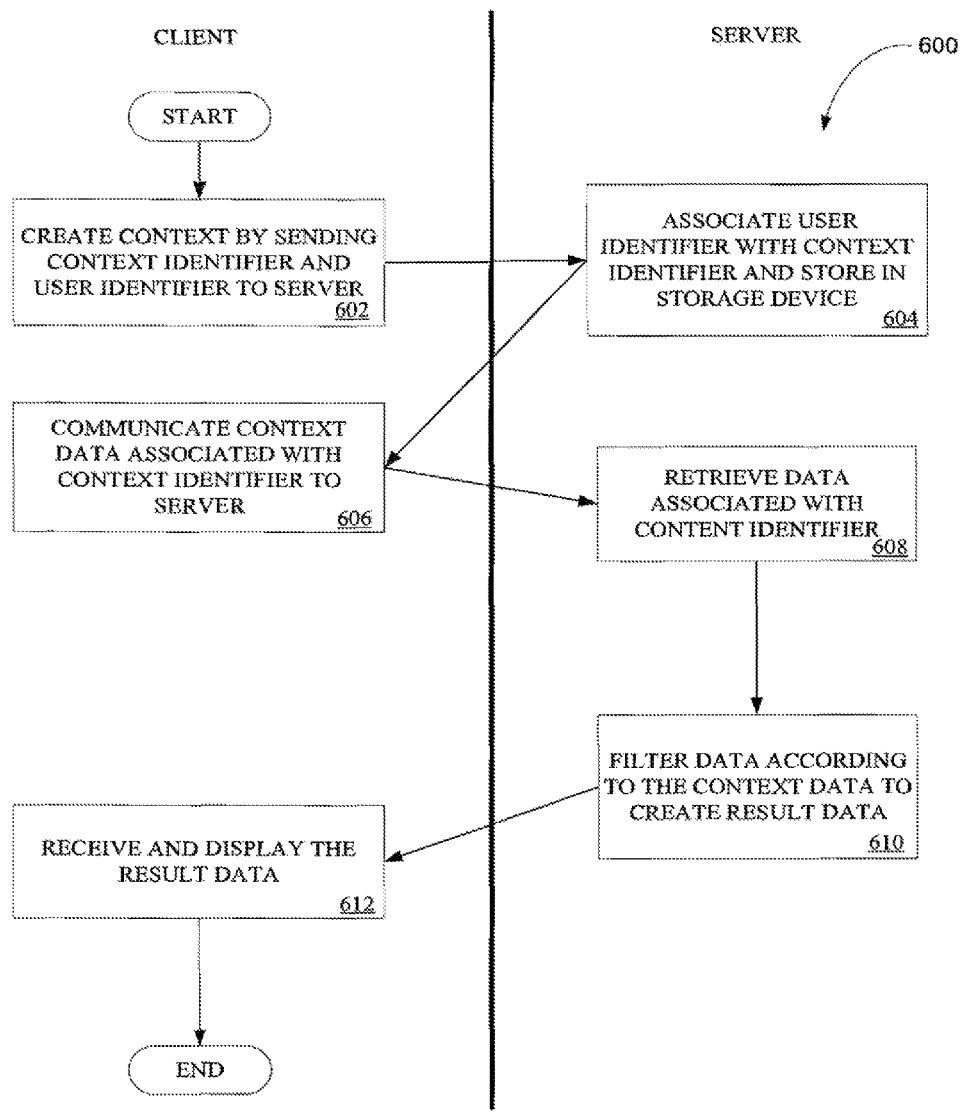
FIG. 6 is a flow chart illustrating an example embodiment of a method for creating a context and generating and receiving result data associated with the created context.

FIG. 6 is a flow chart illustrating an example embodiment of a method 600 for creating a context and generating and receiving result data associated with the created context. At operation 602 a context creator via a user interface (e.g., web interface toolbar) on a client creates a context by communicating a context identifier, such as a product identifier (e.g., digital camera) or service identifier (e.g., plumber) to a server (e.g., at network-based marketplace 112). The server, at operation 604 associates a user identifier with the context identifier. In one embodiment, the client then communicates, at operation 606, context data associated with the context identifier to the server. The context data may include attributes or parameters associated with the created context (e.g., 5 megapixel and 3× optical zoom), URLs associated with the context, filter parameters (e.g., rules), etc.

At operation 608, the server retrieves data associated with the context identifier and filters, at operation 610, the data according to the context data. For example, the context data may serve to refine the context by specifying attributes and parameters. So in one embodiment, the server retrieves all data regarding digital cameras and then filters that data according to the provided attributes and parameters of the context data, such as only data pertaining to 5 megapixel cameras. In another embodiment, the context data may include rules associated with how much data and the source of the data. For example, as described above, the filter may only provide result data from a community group, such as the photography community group 408.

Lastly, at operation 612, the client receives and displays the result data for the context creator (user). In various embodiments, the result data is stored at the server and accessible by the context creator from a variety of client machines and applications as discussed with reference to FIG. 1. In another embodiment, the result data may be cached locally on a client machine for offline use and portability.

Figure 7:
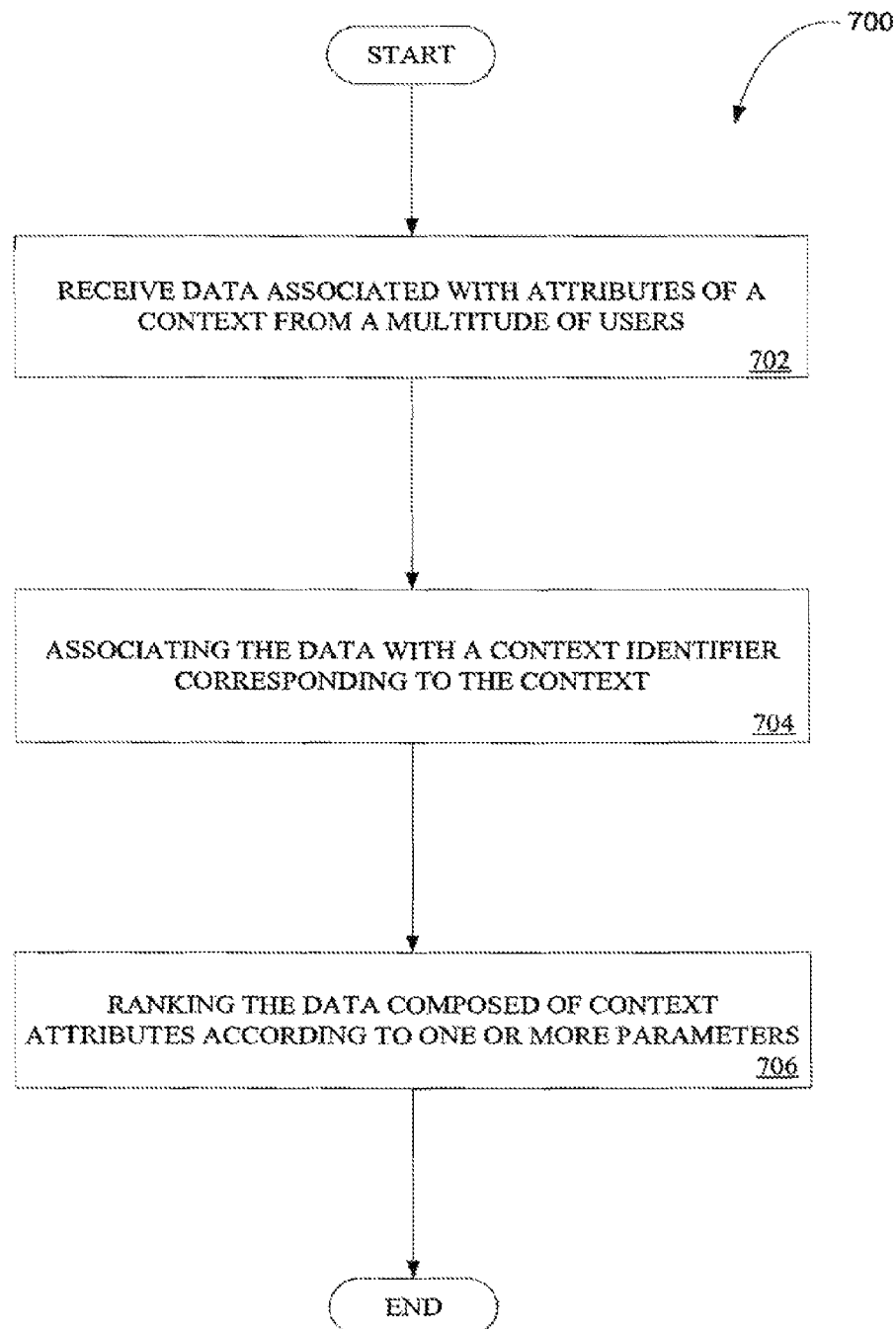
FIG. 7 is a flow chart illustrating an example embodiment of a method for associating and ranking data from users other than the context creator with a context.

FIG. 7 is a flow chart illustrating an example embodiment of a method 700 for associating and ranking data from users other than the context creator with a context. At operation 702 a processing system (e.g., network system 100) receives data associated with attributes of the context from a multitude of users. In one embodiment, the attributes are specific features of the context. For example, attribute 1 is 5 megapixel resolution, attribute 2 is 3× optical zoom, and so on.

The data, at operation 704, is then associated with a context identifier corresponding to the context. Next at operation 706, the processing system ranks the data composed of context attributes according to one or more parameters. In one embodiment, a parameter may be based on popularity or statistical data associated with the attributes. For example, the processing system determines the top five most requested attributes associated with the context and may initially provide only these attributes in a user interface dialogue in response to a user creating a context (e.g., See FIGS. 8 and 9). It can be appreciated that in other embodiments other ranking algorithms may be used, such as data from external sources (e.g., product review sites), a weighted average of an attribute term occurring versus other terms, or other statistical methods utilizing previously captured data, time calculation windows, etc.

Figure 8:
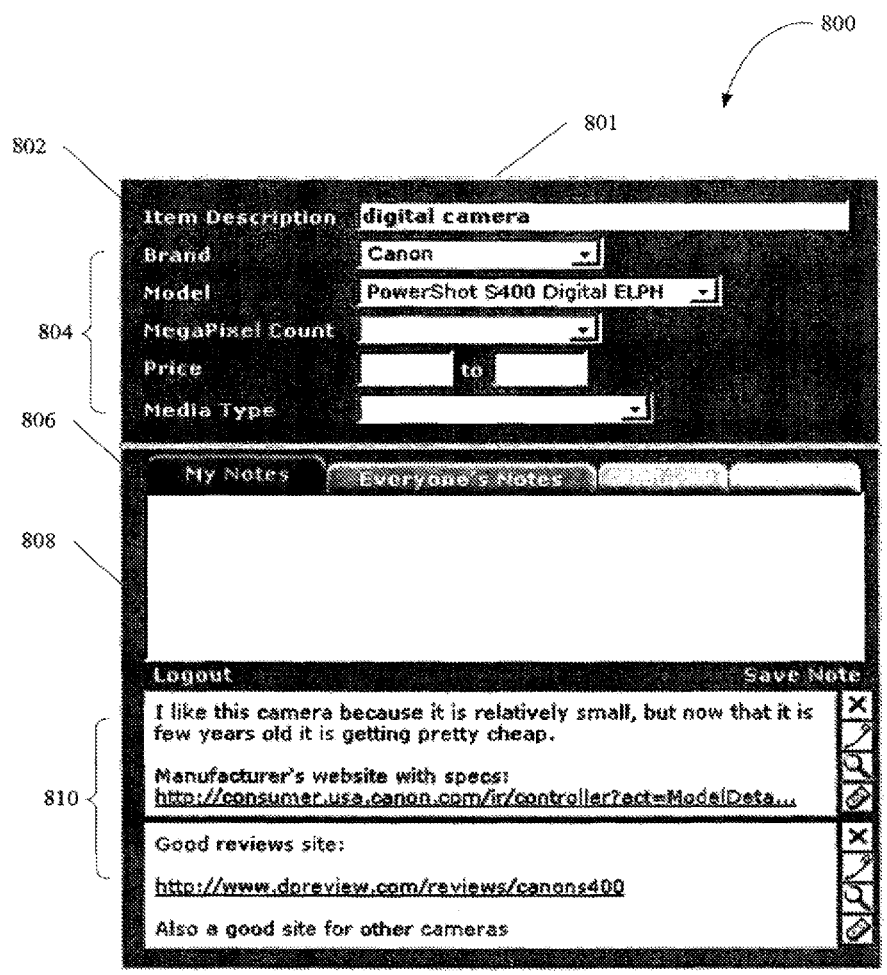
FIGS. 8 and 9 are screenshots of example embodiments of user interfaces illustrating, inter alia, context data and result data.
Figure 9:
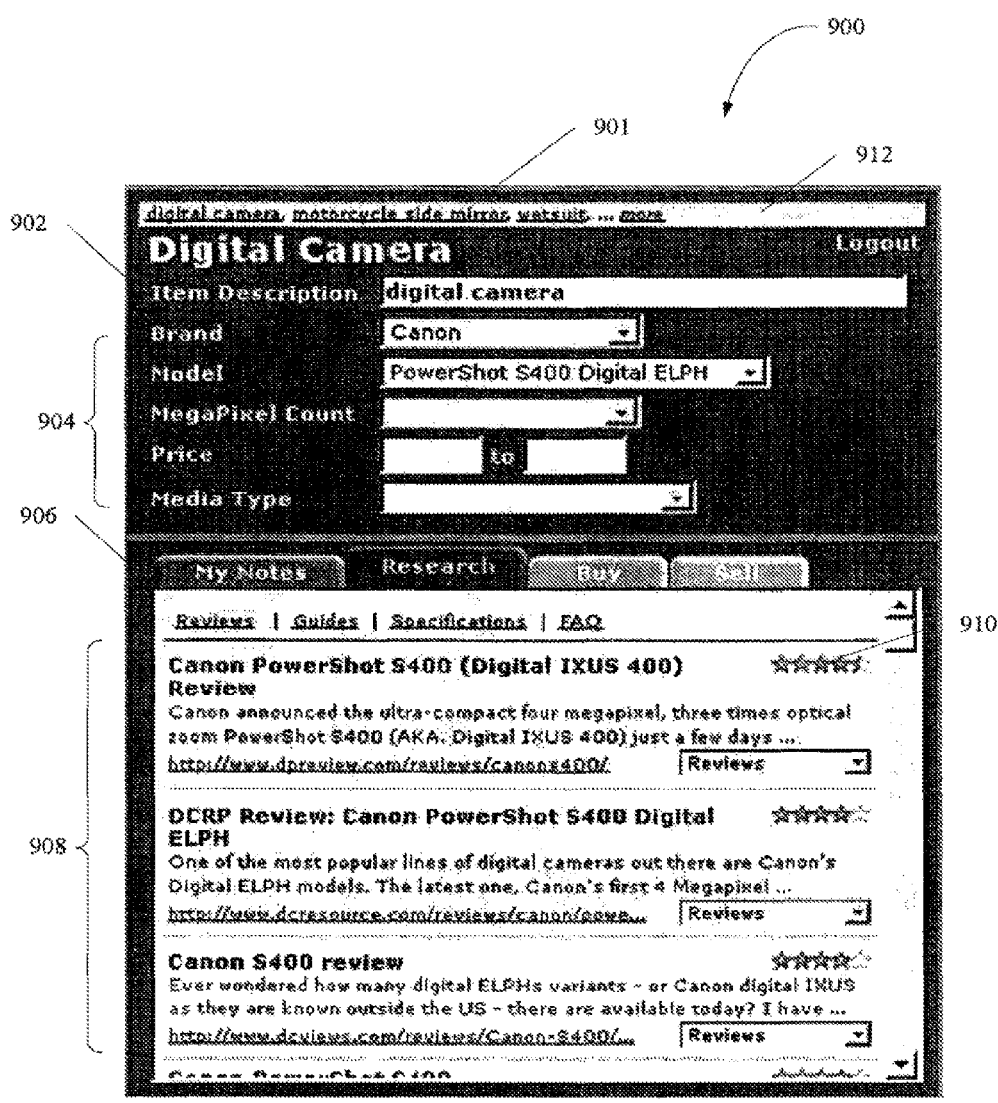

FIGS. 8 and 9 are screenshots 800 and 900 of example embodiments of user interfaces 801 and 901, illustrating, inter alia, context data and result data. The context 802, labeled "Item Description" in this example is "digital camera." Attributes 804 are context attributes (e.g., brand, model, etc.) specific to the context 802 and may vary according a ranking of the most popular, most important, or most requested attributes as determined by the users of network-based marketplace 112, as discussed above. Although not shown here, the user interface 801 may also include a text field to enter additional attributes important to the user.

In one embodiment, the value of the context field (e.g., digital camera) is determined from a user previously creating the context (e.g., from a toolbar) and screenshot 800 is a response in the form of a user interface to an update context command. In another embodiment, the context 802 may be an input field configured to accept input and the attributes 804 are subsequently received and inserted into the user interface 801.

The user interface 801 includes data tabs 806 configured to separate groups of data pertaining to the context 802. In this example, data tabs 806 includes "My Notes," "Everyone's Notes," "Buy," and "Sell." In one embodiment, the data tabs 806 correspond to grouping of result data based on context data identifiers (e.g., my notes, reviews, etc.) as processed by the network system 100, and more specifically, the network-based marketplace 112. In another embodiment, the data may be grouped via context data identifiers locally after it is received at the client hosting the user interface 801.

In this example embodiment, the "My Notes" tab is selected. Field 808 is a text entry field for entering a new note (context data) to be associated with the context 802. The archive field 810 includes notes previously made and stored or cached by the network-based marketplace 112 or a client machine (e.g., client machines 120, 122). The notes section may include text, hypertext, metadata, tags, etc., which when selected by a user input device initiate communication with an associated network location (e.g., a URL).

FIG. 9 includes the screenshot 900 of an example embodiment illustrating the user interface 901 after result data has been received based on the provided attributes 904. In this example, the tab "Research" of data tabs 906 is selected. Because attributes 904 included a brand and model the reviews 908 retrieved correspond to those attributes. However, if reviews or other data (e.g., research/notes from other users) cannot be matched and retrieved based on all the listed attributes, the closest match may be retrieved and communicated to the user. In one embodiment, when the network-based marketplace 112 receives new context data from other users it automatically updates the user interface (e.g., user interface 901) with new result data based on the previously selected filters. For example, if five new reviews and two new notes—from other users associated with the same context— were received at the network-based marketplace 112, it may automatically update all user interfaces pertaining to the same context.

A ranking 910 is indicated by a five star system and may have been determined as described above. Additionally, in an example embodiment, the user of user interface 901 may rank the reviews provided by clicking on the selectable star symbol indicating the rank (e.g., from left to right, one star, two star, and so on). This ranking may be communicated back to the network-based marketplace 112 and tabulated to recalculate the ranking of the review, which may affect its future or current placement on the user interface 901 for this or other users associated with the context 902.

The user interface 901 also includes tag data 912, which is selectable by a user to create a new interface associated with the selected tag. In various embodiments, the tags provided may or may not be related to the context 902, or may be generated based on other attributes or data (e.g., notes) associated with the context 902. The tag data 912 may also be generated based on statistical marketing data. For example, marketing data that indicates people interested in digital cameras are also interested in wet suits.

In one embodiment, the user interface 901 may show a targeted advertisement specifically related to the context 902. The specificity of the targeted advertisement may depend on the level of detail contained in the fields of attributes 904. For example, if the context is digital camera and the attributes are brand is Canon and model is PowerShot S400 Digital Elph, then the targeted advertisements may be from vendors that carry that model and brand. Optionally, the targeted advertisements are selected based on the closest match. For example, if the above attribute of model cannot be satisfied completely, select a targeted advertisement pertaining only to Canon digital cameras.

Figure 10:
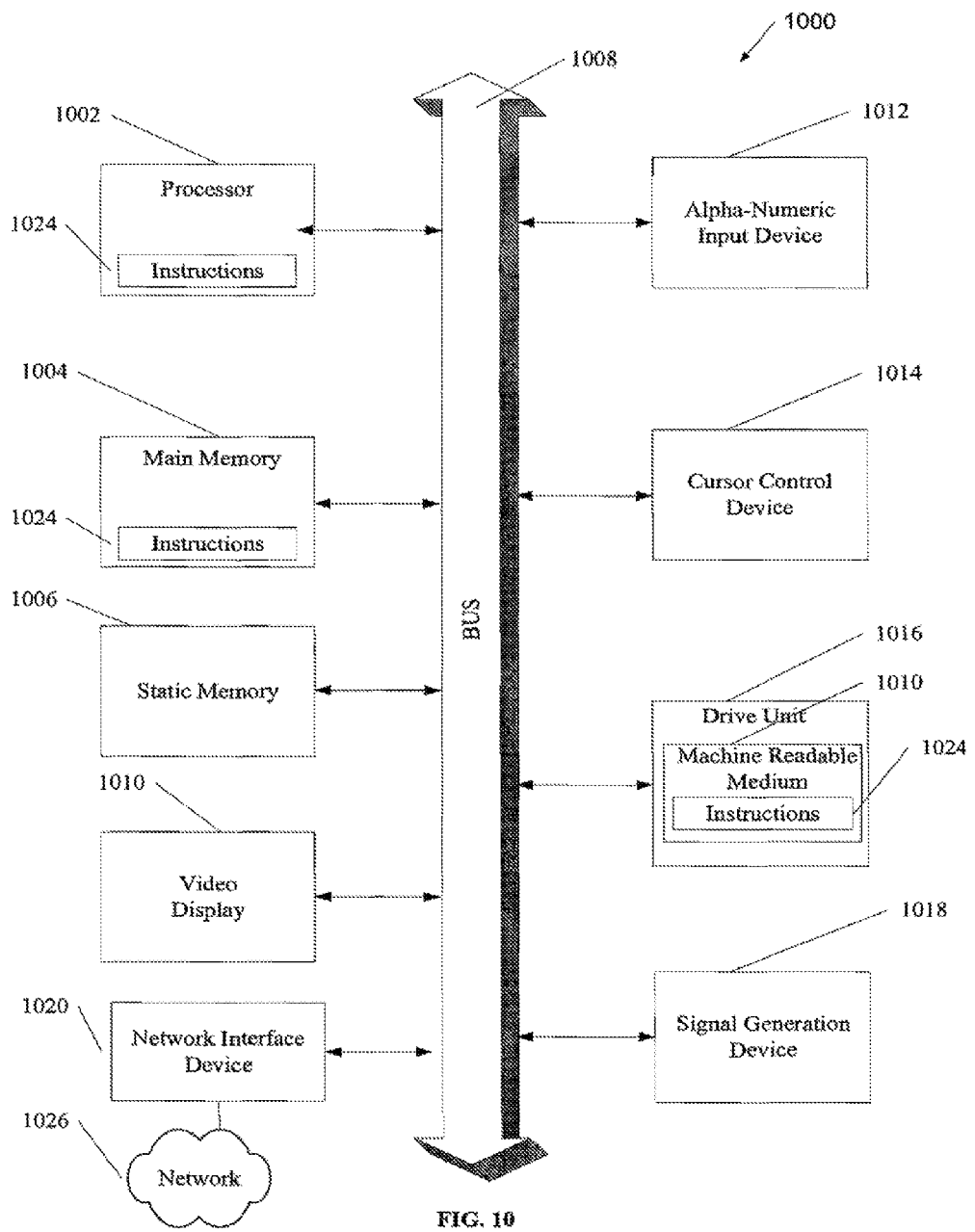
FIG. 10 shows a diagrammatic representation of machine in the example form of a computer system within which a set of instructions when executed may cause the machine to perform any one or more of the methodologies discussed herein.

FIG. 10 shows a diagrammatic representation of machine in the example form of a computer system 1000 within which a set of instructions when executed may cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions and data structures (e.g., software 1024) embodying or utilized by any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 1026 via the network interface device 220 utilizing any one of a number of well-known transfer protocols (e.g., HTTP).

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

We claim:

1. A method, including:
    receiving, by a hardware computer processor, context data indicative of a category of offerings in a provider, the context data associated with a user having a user identifier;
    automatically discovering context attributes associated with the context, by processing attribute data received from a plurality of other users, the attribute data being related to a category of the offerings;
    associating the context data and the context attributes with the user identifier; and
    generating result data that is associated with the context and relevant to the user.

2. The method of claim 1, wherein the context is from a group including a product and a service.

3. The method of claim 1 wherein the result data associated with the context includes at least one from a group including a review list, a recommendation list, research from other users, research from the user, a seller list, and a buyer list.

4. The method of claim 1, further including:
    receiving a rating from the user pertaining to the result data; and filtering the result data according to the rating.

5. The method of claim 1, including filtering the result data according to one of one or more ratings associated with buyers or sellers of products or services included in the result data and geographic data associated with the user when the context is a service.

6. The method of claim 1, including selectively updating the result data based on receiving new data associated with the context.

7. A system, comprising:
    a processor;
    a memory coupled to the processor for storing context data;
    a context module to receive from a client, context indicative of a category of offerings in a provider, the context data associated with a user having a user identifier, the context module further to automatically discover context attributes associated with the context by processing attribute data received from a plurality of other users, the attribute data being related to the category of offerings, and the context module further to associate the context data and the context attributes with the user identifier; and
    a results module to create result data relevant to the user and to communicate the result data to the client.

8. The system of claim 7, wherein the results module is to associate an advertisement from a third party pertaining to a context and to provide the advertisement to a user interface of the user.

9. The system of claim 7, wherein the results module is to provide a selectable portion of the context data and the context attributes associated with the user to another user based on a one or more rules.

10. The system of claim 7, wherein the results module is to selectively update the result data based on receiving new data associated with the context.

11. One or more machine-readable hardware storage devices containing computer instructions that, when executed by a computer, cause the computer to perform operations comprising:

receiving context data indicative of a category of offerings in a provider, the context data associated with a user having a user identifier;

automatically discovering context attributes associated with the context, by processing attribute data received from a plurality of other users, the attribute data being related to a category of the offerings;

associating the context data and the context attributes with the user identifier; and generating result data that is associated with the context and relevant to die user.

* * * * *

UNITED STATES PATENT AND TRADEMARK OFFICE
CERTIFICATE OF CORRECTION

PATENT NO. : 8,832,060 B2  Page 1 of 1
APPLICATION NO. : 13/970110
DATED : September 9, 2014
INVENTOR(S) : Sundaresan et al.

It is certified that error appears in the above-identified patent and that said Letters Patent is hereby corrected as shown below:

In the claims

In column 13, line 11, in Claim 11, delete "die" and insert --the--, therefor

Signed and Sealed this
Seventeenth Day of November, 2015

Michelle K. Lee
*Director of the United States Patent and Trademark Office*